United States Patent [19]

Basu et al.

[11] 3,947,117

[45] Mar. 30, 1976

[54] EXPOSURE CONTROL SYSTEM

[75] Inventors: Samir Basu; Gerald J. Maguire, both of Stevenage, England

[73] Assignee: Xerox Corporation, Stamford, Conn.

[22] Filed: June 17, 1974

[21] Appl. No.: 479,945

[30] Foreign Application Priority Data

Dec. 21, 1973 United Kingdom............... 59539/73

[52] U.S. Cl. .................. 355/68; 250/205; 315/151; 355/83

[51] Int. Cl.² .................. G03B 27/74; G03B 27/78; H05B 37/02; G01J 1/32

[58] Field of Search ............... 355/3, 14, 68, 69, 83; 250/205, 219 FR; 315/151

[56] References Cited

UNITED STATES PATENTS

| | | | |
|---|---|---|---|
| 3,728,023 | 4/1973 | Stevko et al. | 355/3 X |
| 3,743,405 | 7/1973 | Morse et al. | 355/3 R |
| 3,746,446 | 7/1973 | Sliwkowski | 355/69 X |
| 3,795,444 | 3/1974 | Glidden et al. | 355/69 X |

*Primary Examiner*—Richard A. Wintercorn
*Attorney, Agent, or Firm*—Robert J. Bird

[57] ABSTRACT

An automatic exposure system for a copying machine which includes a scanning optical system having a prescan period, comprising a lamp illumination control to receive light reflected from an original document to be copied, a lamp illumination control circuit and a synchronizing circuit, said control loop being arranged to adjust the illumination provided by the lamp means during the prescan period to maintain the intensity of light being received by an image forming surface from the original document at a predetermined level.

2 Claims, 3 Drawing Figures

EXPOSURE CONTROL SYSTEM

The invention relates to an exposure control system primarily though not exclusively for an electrostatographic copy machine.

In the practice of xerography, as described, for example, in U.S. Pat. No. 2,297,691 to Chester F. Carlson, a xerographic surface comprising a layer of photoconductive insulating material affixed to a conductive backing is used to support electrostatic images. In the usual method of carrying out the process, the xerographic plate is electrostatically charged uniformly over its surface and then exposed to a light pattern of the image being reproduced to thereby discharge the charge in the areas where light strikes the layer. The undischarged areas of the layer thus form an electrostatic charge pattern in conformity with the configuration of the original light pattern.

The latent electrostatic image can then be developed by contacting it with a finely divided electrostatically attractable material such as a powder. The powder is held in image areas by the electrostatic charge on the layer. Where the charge is greatest, the greatest amount of material is deposited; and where the charge is least, little or no material is deposited. Thus, a powder image is produced in conformity with the light image of the copy being reproduced. The powder is subsequently transferred to a sheet of paper or other surface and suitably affixed thereto to form a permanent print.

It can be readily appreciated that the quality of the print is in large part dependent on the exposure of the charged xerographic plate to the radiation image. The largest single factor effect exposure latitude, i.e. range of illumination intensity, is the efficiency of the developer system. In other words, if the developer system is highly sensitive so as to develop background or image portions as "grey" areas when in reality these are white, then illumination control must be commensurately sensitive to provide the proper exposure of the charged xerographic surface. With modern day improvement to xerographic developer system, such as an electrically biased backing electrode to enhance solid area development, the desirability of maintaining proper illumination becomes increasingly apparent.

A uniformly high level of illumination as required for exacting exposure is complicated by many factors. For example, variation in lamp output due to lamp aging or deterioration is sufficient to cause development of white areas thereby detracting from overall quality of the print.

It has been determined, for example, that deterioration of aperture lamps is dependent on properties of their phosphor coating. The deterioration characteristics of aperture lamps having the same type of phosphor coating do not differ significantly. The deterioration of certain types of aperture lamps can be as much as 40% after approximately 1000 hours of use. Such a large change in illumination level cannot be tolerated in most copying systems. The aperture lamps are generally replaced after a time period much earlier than the 1000 hours deterioration period mentioned hereinabove.

Some prior art proposals for compensating for variation in lamp output utilize photosensitive devices, such as photocells, which measure lamp output and adjust various machine parameters to compensate for the variation in lamp output. The present invention relates as particularly suitable for providing intensity of illumination compensation in an electrostatographic machine which includes a scanning optical system.

A copying machine such as that described in U.S. Pat. No. 3,062,109 uses an optical system comprising two fixed mirrors with a lens between the mirrors, the stationary original being illuminated by lamps on a movable lamp carriage, and light from the original being screened from the projection system except for a small slit between the lamps. U.S. Pat. No. 3,301,126 describes a document copying machine in which the whole of the stationary original is illuminated during exposure, and scanning is achieved by oscillating one of the mirrors of the projection system about an axis in its plane. It has been proposed, for example in U.S. Pat. No. 3,642,366, to have a more compact image projection system in which two mirrors are moved in different directions at speeds relating to the speed of movement of the photosensitive surface.

In copiers having optical systems of the kind already mentioned and generally any copier relying on a photosensitive response, it may be desirable to adjust the illumination of the document to be copied to maintain as far as possible a constant irradiance at the image plane, that is at the photosensitive surface of photoreceptor. This constant irradiance is desirably achieved for various original document background reflectances and as far as practical in some cases despite aging or other forms of deterioration of the optical system and deterioration of lamps.

In the above copiers, copies provided depend for their definition on the difference of light intensity between light and dark parts of an original document to be copied so that adjustment of the illumination of the document may not be so critical. In a copier as described in U.S. Pat. No. 3,084,043 the definition of copies made depends in effect on the actual value of the illumination received, rather than a differential value, so that ensuring near constant irradiance received at the photoreceptor surface for differing types of original, that is, for each individual original, becomes even more important.

It is an object of the present invention to provide an improved exposure control system suitable for an electrostatograhic copier machine having a scannng optical arrangement.

According to the invention, there is provided an automatic exposure system for a copying machine which includes a scanning optical system having a prescan period, comprising a lamp illumination control loop associated with a light intensity detector positioned to receive light reflected from an original document to be copied, a lamp illumination control circuit and a synchronizing circuit, said control loop being arranged to adjust the illumination provided by the lamp means during the prescan period to maintain the intensity of light that is received by an image forming surface from the original document at a predetermined level.

The lamp illumination control circuit may comprise a lamp supply drive circuit.

An automatic exposure system, for a copying machine, according to the invention will now be described by way of example with reference to the accompanying drawing in which.

Figure 2:
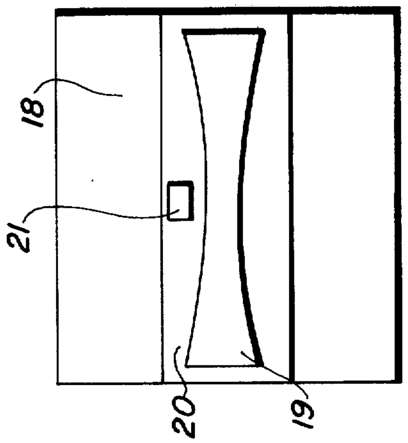
FIG. 2 shows a view A—A of FIG. 1.
Figure 1:
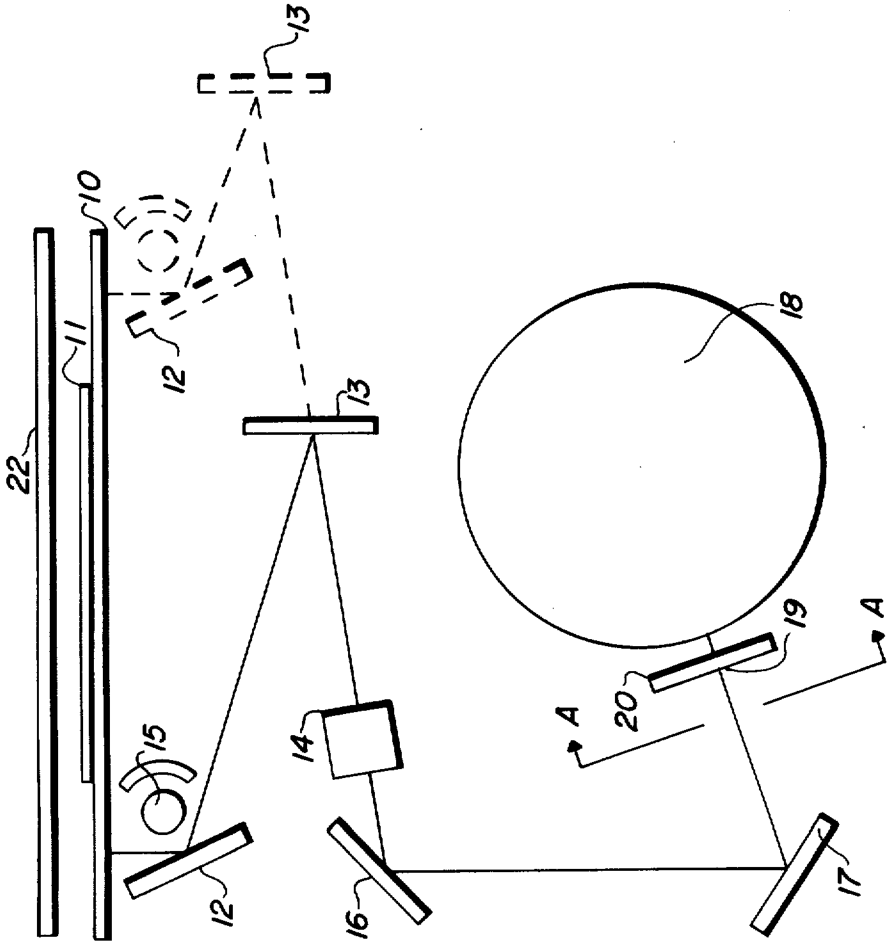
FIG. 1 shows a schematic view of an optical scanning system of the copying machine.

Referring to the drawings, a platen 10 is provided to support a document 11. A scanning mirror system includes two movable mirrors 12 and 13 shown in their extreme left and right positions in full and dotted outline respectively. The mirror 13 is arranged to move at half the speed of the mirror 12 during scanning to maintain the optical distance constant between the document 11 and a lens 14. A tubular lamp 15 extending across the platen 10 parallel to the mirror 12 moves with the mirror 12. The lamp 15 is provided as illumination means to illuminate the document 11 through the platen 10 during scanning.

An optical path extending from the platen 10 to the lens 14 continues beyond the lens to be reflected in sequence by mirrors 16 and 17 towards a photoreceptor 18. An optical slit 19, better seen in FIG. 2, is provided in a cover plate 20. The slit is used to restrict the image field and thus preserve image quality. A light intensity detector 21, see FIG. 2, is mounted on the plate 20 adjacent the slit 19. A platen cover 22 is laid over the document 11.

The configuration or shape of the slit is as shown, being narrower at its mid-point than at its extremities. This shape, as is already known in the art, is primarily to compensate for the uneven distribution of illumination inherent in the lamp 15. Other shapes can be provided for lamps having different distribution characteristics. The photoreceptor could be as fully described and illustrated in U.S. Pat. No. 3,084,043. That is, in which a latent image is formed xerographically on the photoreceptor 18 and then developed by a liquid development process.

In general operation, the document 11 is scanned by the sweep of the mirrors 12 and 13 from left to right forming a latent image of the document on the photoreceptor 18 which rotates in synchronism with the movement of the mirrors 12 and 13. The intensity of illumination incident on the document in the present example is determined by the magnitude of current supplied to the lamp 15. To provide good copies or originals of widely differing reflectance properties, we alter the illumination of the originals according to their reflectance. In the embodiment, this is achieved by a prescan of the document 11 and by controlling the current to the lamp 15 in dependence upon the maximum intensity of light received at the detector 21 throughout the prescan.

In the described embodiment, the detector 21 is described as being adjacent the photoreceptor 18. This is a preferred position so that any variations or deteriorations of the components of the optical system will be taken into account by the operation of the detector 21. The detector 21 could be placed in some other part of or adjacent the optical path and more than one detector could be provided across the width of the slit for example.

Circuit means (see FIG. 3) are provided to receive signals from the detector 21 corresponding to the intensity of the illumination received by the detector 21. The circuit means are arranged and designed to respond to the detector signals and to control the current to the lamp 15 appropriately. Alteration of the current is arranged as far as possible to ensure there is, at the detector 21 and hence at the photoreceptor, constant irradiance irrespective of the background of the document to be copied. During prescan the circuit means is arranged to respond to signals corresponding to the maximum illumination received at the detector 21 and then adjust the current to the lamp 15 to alter the irradiance at the photoreceptor to some predetermined desired level.

Thus, it will be appreciated that during or as a result of the prescan the lamp current is automatically adjusted by the circuit means to provide the irradiance at the photoreceptor at the desired level irrespective of the actual reflectance of the background of the document to be copied. As an illustration, if the background is of a low reflectance value, the current to the lamp 15 is increased and maintained at this increased value for the copying or operational scan of the mirrors 12 and 13.

Difficulties can arise with the arrangement so far described, if the document to be copied is smaller than the area scanned during the prescan. If the platen cover surface is of higher reflectance then the background of the document, the current to the lamp 15 will be adjusted to a lower value than is required to provide the desired irradiance value at the photoreceptor when the actual document is copied. If the platen cover is deliberately made of low reflectance so as to be much less reflective than backgrounds of all documents likely to be copied, then in the situation where the document is smaller than the prescanned area, the area around a copy of the document produced by the apparatus will be very dark. Solutions to such problems can be described in copending applications Ser. No. 472,023

Figure 3:
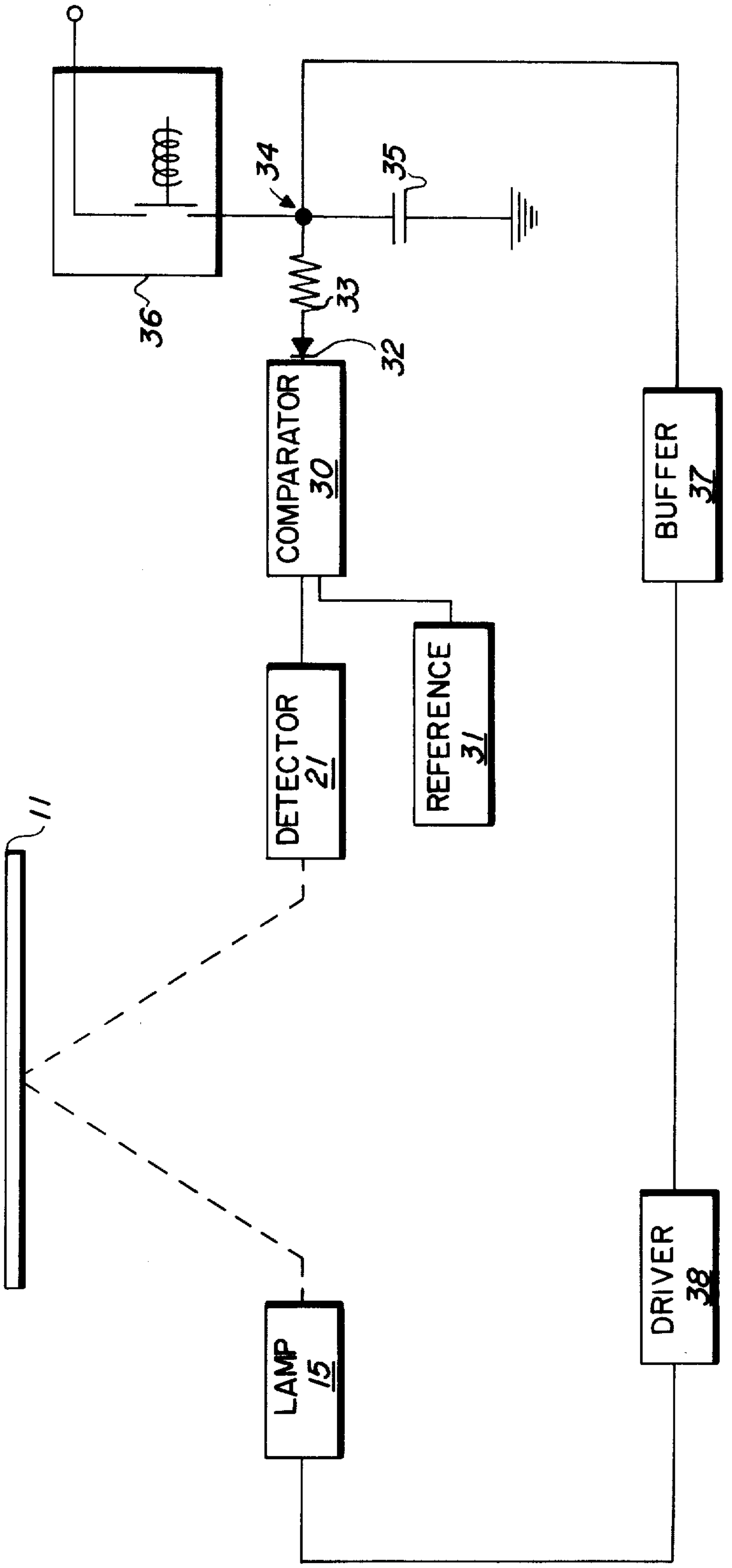
FIG. 3 shows the circuit diagram of the automatic exposure control.

Referring to FIG. 3, the circuit means already mentioned above will be described in more detail. The detector 21 has its output connected to a comparator circuit 30, also connected to a reference voltage source 31. One side of the comparator is connected through a diode 32 (to allow current flow towards the comparator 30) and a resistor 33 to a reference point connection 34. The connection 34 is between a memory capacitor 35 and a synchronizing switching circuit 36. The connector 34 is tied through a high impedance buffer circuit 37 to a lamp drive circuit 38 for supplying current to the lamp 15.

In use, the lamp 15 is supplied separately (not shown) with heating current and the lamp drive circuit is arranged to supply the lighting element only of the lamp 15.

At the beginning of a copying cycle the output of the voltage reference source 31 is set manually to some desired level which for the conditions of the various components of the copying machine including the photoreceptors, and the ambient parameters perhaps, which appear on recent operational experience to provide good copies.

In the described copier the optical scanning device is arrested in a position so that its first movement comprises a prescan cycle.

At the beginning of a prescan period, the synchronizing circuit 36 is arranged to supply a high charging current to charge rapidly the capacitor to a predetermined high value corresponding to the value for a maximum current to be supplied to the lamp 15. The synchronizing circuit is then disconnected and the prescan continues. Normally, we arrange for rapid charging to take place in less than say the first 10% of the prescan period. For the remainder of the prescan period, the voltage output of the detector 21 is compared with the voltage of the reference source 31 by the comparator 30. If the detector output voltage is higher than the reference source voltage, the comparator 30 allows current to flow from the capacitor 35 to lower its voltage. As a result the current being supplied to the lamp 15 is automatically reduced. This reduction continues until the detector output voltage equals the reference source voltage, whereafter discharging of capacitor 35 ceases. The voltage of the capacitor then remains substantially constant at the adjusted level during the following scanning period provided the scanned portion of the document continues to display the same irradiance.

At the commencement of the next prescan period, the capacitor 35 is again charged to a maximum value and subsequently discharged during the remainder of the prescan period to a desired or adjusted value as above. In this way the effective exposure is arranged to be automatically adjusted, that is reduced in the described embodiment, to a level dependent upon the mean or maximum irradiance value of the original document to be copied. When the mean value is chosen or the maximum irradiance value is the effective value used depends on what, if any, compensation is used. Forms of compensation for erroneous signals from say, small original documents and due to other causes can be as described more fully in the aforementioned copending application Ser. No. 472,023.

In the described circuit, it is noted that at the beginning of each prescan, the lamp current is switched to a maximum value. In another arrangement, we supply the capacitor 35 for the first major part, say 90% of the prescan with a smaller charging current so as to increase the voltage at the reference point 34 more gradually. With such an arrangement, the current supply to the lamp tends to increase throughout the prescan but in practice is maintained fairly constant as the capacitor 35 discharges through the action of the comparator circuit 30. In other words, under the action of this other arrangement the lamp is adjusted and re-adjusted throughout the prescan period rather than, as in the first described embodiment, adjusted, in a reducing sense only, from a maximum value. The capacitor holds its scan voltage for the next prescan. This other arrangement is advantageous especially where a number of originals having similar background irradiance properties or multi copies of one original are to be copied by the copying apparatus. The principal advantages being that the lamp 15 is not switched to its maximum level so often and tends to have a longer life.

We arrange, in the automatic exposure system described, to change the polarity after every copying cycle (by means not shown) of the current supplied to the lamp 15 by the lamp driver circuit 38. This tends to increase the life of the lamp.

In the embodiments described, the response to changes of supply of the lamps we use, fluorescent or gas discharge lamps, is comparatively rapid. Thus, the prescan period can be relatively short. For example, the prescan time is 0.20 seconds and the scan period is 1.9 seconds. For other forms of lamps it may be necessary to extend the prescan time period to allow the automatic exposure control system time to adjust and possibly re-adjust the lamp illumination output to the optimum level for the scanning period.

It will be appreciated that the systems described may be used in conjunction with a multi-lamp copying machine.

Whereas the invention has been described in relation to an exposure system in which the electrical supply to the lamp is adjusted to maintain a constant illumination intensity, the invention may be carried using other techniques of controlling the illumination. Such techniques include altering the optical system, by varying a slot width in the system say, to reduce the effective intensity of received illumination by the image forming surface without altering the output of the lamp.

While a particular embodiment of the invention has been described above it will be appreciated that various modifications may be made by one skilled in the art without departing from the scope of the invention as defined in the appended claims.

What is claimed is:

1. An automatic exposure system for a copying machine which includes a scanning optical system having a prescan period, comprising lamp means and a lamp illumination control loop operatively connected to a light intensity detector positioned to receive light reflected from an original document to be copied, and a lamp illumination control circuit including a lamp drive circuit, said control loop being arranged to adjust the illumination provided by said lamp means in response to signal generated by said detector during prescan period to maintain the intensity of light being received by an image forming surface from the original document at a predetermined level, said lamp means comprising a preheated fluorescent lamp and said electrical supply comprises supply for the lighting element of the lamp.

2. An exposure control system for a photocopying apparatus including:

- a scanning optical system having a prescan period,
- a lamp to illuminate objects to be copied, said lamb being a preheated gas discharge lamp,
- a light intensity detector positioned to receive light reflected from said objects and produce a signal voltage in response to the level of intensity of said reflected light during said prescan period,
- a lamp illumination control loop operatively connected to said light intensity detector, said control loop comprising a lamp illumination control circuit including a lamp drive circuit, a reference voltage source, and a comparator operatively connected to said light intensity detector and said reference voltage source to compare voltages therefrom, and means responsive to the comparison made by said comparator to decrease current to said lamp if said signal voltage is greater than said reference voltage and to increase current to said lamp is said signal voltage is smaller than said reference voltage.

* * * * *